(12) United States Patent
Bui

(10) Patent No.: US 7,149,198 B2
(45) Date of Patent: Dec. 12, 2006

(54) SYSTEM AND METHOD FOR VOICE PROCESSING AND TRANSPORTING IN A PROTOCOL INDEPENDENT TANDEM FREE OPERATION MANNER

(75) Inventor: Hung Viet Bui, Chantilly, VA (US)

(73) Assignee: Nextel Communications Inc., Overland Park, KS (US)

(*) Notice: Subject to any disclaimer, the term of this patent is extended or adjusted under 35 U.S.C. 154(b) by 0 days.

(21) Appl. No.: 11/201,689

(22) Filed: Aug. 11, 2005

(65) Prior Publication Data

US 2006/0056428 A1    Mar. 16, 2006

Related U.S. Application Data

(60) Provisional application No. 60/608,915, filed on Sep. 13, 2004.

(51) Int. Cl.
 *H04Q 7/00* (2006.01)
 *H04L 12/50* (2006.01)
 *H04L 12/56* (2006.01)
 *H04J 3/16* (2006.01)
 *H04J 3/22* (2006.01)
 *H04J 3/00* (2006.01)

(52) U.S. Cl. .............. 370/328; 370/401; 370/466; 370/476

(58) Field of Classification Search .............. 370/328, 370/401, 466, 476–477
See application file for complete search history.

(56) References Cited

U.S. PATENT DOCUMENTS

| | | | | |
|---|---|---|---|---|
| 6,044,082 | A * | 3/2000 | Nygard et al. | 370/437 |
| 6,538,985 | B1 * | 3/2003 | Petry et al. | 370/203 |
| 2001/0043605 | A1 * | 11/2001 | Arakawa | 370/395.1 |
| 2002/0196790 | A1 * | 12/2002 | Koistinen | 370/400 |

* cited by examiner

*Primary Examiner*—Kevin C. Harper

(57) ABSTRACT

A wireless communication system including an originator media gateway to encode voice data into an IP packet depending on whether tandem free operation (TFO) or normal operation is being used. The media gateway makes such determination independent of the TFO protocol being used. In particular, the media gateway determines that TFO is being used by determining whether bits in particular fields of a predetermined number N of voice octets are filler bits or not. If they are filler bits, then TFO is being used, otherwise, normal operation is being used. If TFO is being used, the media gateway forms an IP packet with data from only another particular fields of the voice octets. If normal operation is used, the media gateway forms an IP packet with data from the entire voice octets. A target media gateway determines TFO or normal operation by examining the size of the received IP packet.

27 Claims, 4 Drawing Sheets

SYSTEM AND METHOD FOR VOICE PROCESSING AND TRANSPORTING IN A PROTOCOL INDEPENDENT TANDEM FREE OPERATION MANNER

CROSS-REFERENCE TO A RELATED APPLICATION

This application claims the benefit of the filing date of Provisional Patent Application, Ser. No. 60/608,915, filed on Sep. 13, 2004, and entitled "System and Method for Tandem Free Operation Spoofing," which is incorporated herein by reference.

FIELD OF THE INVENTION

This invention relates generally to wireless communication systems, and in particular, to a system and method for voice processing and transporting over a packet data network in a protocol independent and efficient tandem free operation (TFO) manner.

BACKGROUND OF THE INVENTION

In conventional wireless communication systems, voice transmissions between a base station (BS) and a mobile station (MS) (e.g., a cellular and/or dispatch handset) are typically encoded (e.g., compressed) to make efficient use of the assigned spectrum for wireless communications. On the other hand, voice transmissions across the wired network are typically not encoded (e.g., uncompressed). Such conventional wireless communication systems typically include a transcoder and rate adapter unit (TRAU) to encode voice data for transmission via the wireless medium, and decode voice data for transmission via the wired network. The following example further illustrates this aspect of conventional wireless communication systems.

FIG. 1 illustrates a block diagram of a conventional wireless communication system 100. The system 100 includes a first mobile switching center (MSC) 102, a first TRAU 104, and a first base station 106 coupled together by way of a wired communications network. The system 100 also includes a second MSC 110, a second TRAU 112, and a second base station (BS) 114 coupled together by another wired communications network. The first and second MSCs 102 and 110 may be coupled to a public switched telephone network (PSTN) 120. In this example, base station (BS) 106 is assigned to communicate with MS 108 via the wireless medium, and base station 114 is assigned to communicate with MS 116 via the wireless medium.

When voice data is sent from the originator MS 108 to the target MS 116, the voice data is first encoded (e.g., compressed) by the originator MS 108 and then sent to the base station 106 via the wireless medium. The base station 106 then sends the encoded voice data to the first TRAU 104. The transmission of the encoded voice data from the MS 108 to the base station 106 and subsequently to the first TRAU 104 is typically at a rate lower than the full voice transmission rate (e.g., typically less than the 64 kbps full voice rate). The first TRAU 104 then decodes (e.g., decompresses) the voice data, and sends it to the first MSC 102 at the full voice transmission rate (e.g., 64 kbps).

The first MSC 102 forwards the decoded voice data to the second MSC 110 at the full voice transmission rate (e.g., 64 kbps). This transmission may be made by way of a private network, or the PSTN 120. The second MSC 110 then forwards the decoded voice data to the second TRAU 112 at the full voice transmission rate (e.g., 64 kbps). The second TRAU 112 encodes (e.g., compresses) the encoded voice data and sends it to the target MS 116 by way of the base station 114 at a rate lower than the full voice transmission rate (e.g., <64 kbps).

It was noted in the industry that the conventional wireless communication system 100 has several drawbacks. First, if the originator MS 108 and base station 106 use the same encoding for voice transmission as that of the target MS 116 and base station 114, the decoding and encoding processes performed respectively by the first and second TRAUs 104 and 112 are unnecessary. Second, in such case, the decoding and then re-encoding of the voice data unnecessarily uses processing power of the first and second TRAUs 104 and 112. Third, the decoding and then re-encoding of the voice data degrades the voice quality of the delivered speech.

As a result of these drawbacks, tandem free operation (TFO) was developed to eliminate the decoding and encoding performed by the first and second TRAUs 104 and 112 under certain condition. That is, if it is determined that the encoding protocol of the voice transmission of the originator MS 108 and base station 106 is the same as that of the target MS 116 and base station 114, then the first and second TRAUs 104 and 112 may be configured to automatically eliminate the decoding and encoding processes, respectively, when it is not necessary to do so. This process is typically dynamic, such as in cases when during a voice call, the TRAUs 104 and 112 have to change from encoding-enabled mode to encoding-disabled mode or vice versa. For example, a voice call can begin in tandem free operation (TFO) mode, but when the # key of the originator MS 108 is pressed, the originator MS 108 sends out a dual tone multi-frequency (DTMF) signal intended for the target MS 116. In such case, the TRAUs 104 and 112 disable the tandem free operation (TFO) so that the DTMF signal is sent across the network and to the target MS 116 in an uncompressed format.

In order to operate under tandem free operation (TFO) mode, the TRAU 104 still uses full voice transmission rate (e.g., 64 kps) medium to send compressed voice data across the network. For each octet of data, only a portion of each octet contains voice data information. The remaining portion of each octet is populated with filler bits containing no information. For example, if the encoded voice data bit rate is 16 kbps, then only two (2) bits out of the eight (8) bits in each octet contain voice information. The originator and target TRAUs 104 and 112 exchange TFO protocol information by embedding protocol data in the two useful bits of each octet transported between the two TRAUs.

Protocols for TFO have been developed for GSM- and CDMA-based networks (See GSM 02.53, Tandem Free Operation (TFO) Service Description, version 8.0.1 Release 1999; and 3GPP2 A.S0004-B v2.0, CDMA tandem Free Operation, Aug. 5, 2002).

Wireless communication systems are now being developed to provide voice transmissions via an Internet Protocol (IP) packet network. Accordingly, instead of the voice transmission, in this example, being sent from the first MSC 102 to the second MSC 110 by way of a private network or the PSTN 120, such transmission would be by way of an IP packet network. It would be desirable for such IP network-based wireless communication systems to have TFO capability. It would also be desirable for the voice transmission across the IP network to be made in an efficient manner and independent of the TFO protocol used by the TRAUs.

SUMMARY OF THE INVENTION

An aspect of the invention relates to a wireless communication system, comprising a base station, a transcoder and rate adapter unit (TRAU), and a media gateway. The media gateway is adapted to examine a predetermined number N of voice data groups received from the TRAU, wherein each of the voice data groups comprises first and second fields; determine whether bits in respective second fields of the N groups are filler bits; and form a data packet (1) including data in the first fields but not in the second fields of the N groups if the bits in the second fields of the N groups are filler bits, or (2) including data in the first and second fields of the N groups if the bits in the second fields of the N groups are not filler bits.

Another aspect of the invention relates to a wireless communication system, comprising a base station, a transcoder and rate adapter unit (TRAU), and a media gateway. The media gateway is adapted to receive a data packet; determine a size of the data packet; and form a predetermined number N of voice data groups, wherein each of the voice data groups comprises a first field and a second field, wherein the first field includes data from the data packet and the second field includes filler bits if the size of the data packet is relatively small, or the first and second fields include data from the data packet if the size of the data packet is relatively large.

Yet another aspect of the invention relates to a network device (e.g., an originator media gateway) comprising a first network interface, a second network interface, and a processor. The processor is adapted to examine a predetermined number N of voice data groups received from a transcoder and rate adapter unit (TRAU) by way of the first network interface, wherein each of the voice data groups comprises first and second fields; determine whether bits in respective second fields of the N groups are filler bits; form a data packet (1) including data in the first fields but not in the second field of the N groups if the bits in respective second fields of the N groups are filler bits, or (2) including data in the first and second fields of the N groups if the bits in respective second fields of the N groups are not filler bits; and send the data packet to another network device by way of the second network interface.

Still another aspect of the invention relates to a network device (e.g., a target media gateway), comprising a first network interface, a second network interface, and a processor. This network device operates under the assumption that the packet size is determined at the time the connection is made between the target media gateway and the originator media gateway. If the originator media gateway is sending voice data in a non-tandem free operation (TFO), the negotiated packet size is the same as a predetermined size. If, on the other hand, the originator media gateway is sending voice data in a tandem free operation (TFO), the negotiated packet size is smaller than the predetermined size.

More specifically, the processor is adapted to receive a data packet by way of the first network interface; determine a size of the data packet; form a predetermined number N of voice data groups, wherein each of the voice data groups comprises a first field and a second field, wherein the first field includes data from the data packet and the second field includes filler bits if the size of the data packet is smaller than the predetermined size, or the first and second fields include data from the data packet if the size of the data packet is at the predetermined size; and send the predetermined number N of voice data groups to a transcoder and rate adapter unit (TRAU) by way of the second network interface.

Other aspects, features, and techniques of the invention will be apparent to one skilled in the relevant art in view of the following detailed description of the exemplary embodiments of the invention.

DETAILED DESCRIPTION OF THE EXEMPLARY EMBODIMENTS

Figure 1:
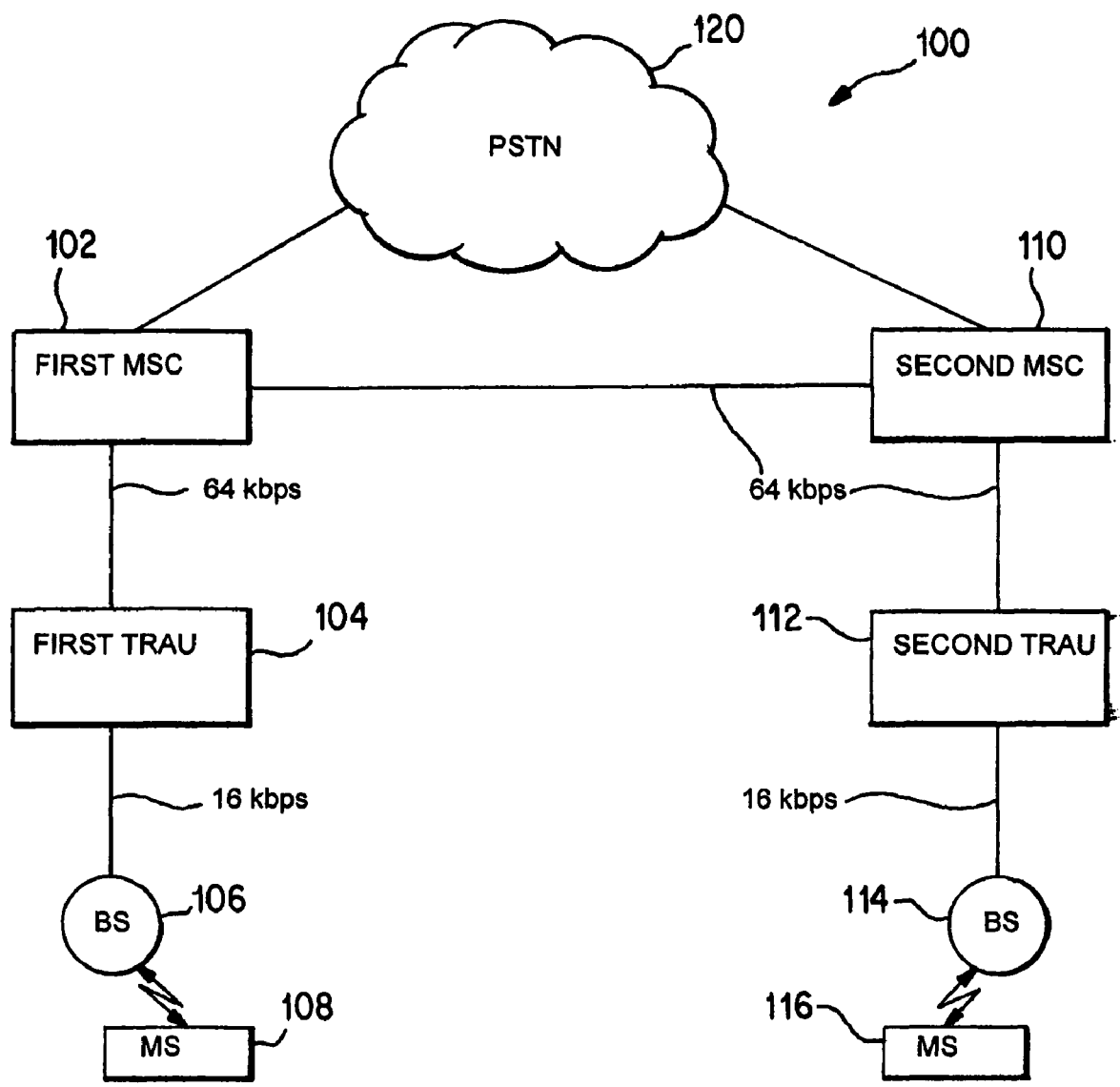
FIG. 1 illustrates a block diagram of a conventional wireless communication system.
Figure 2:
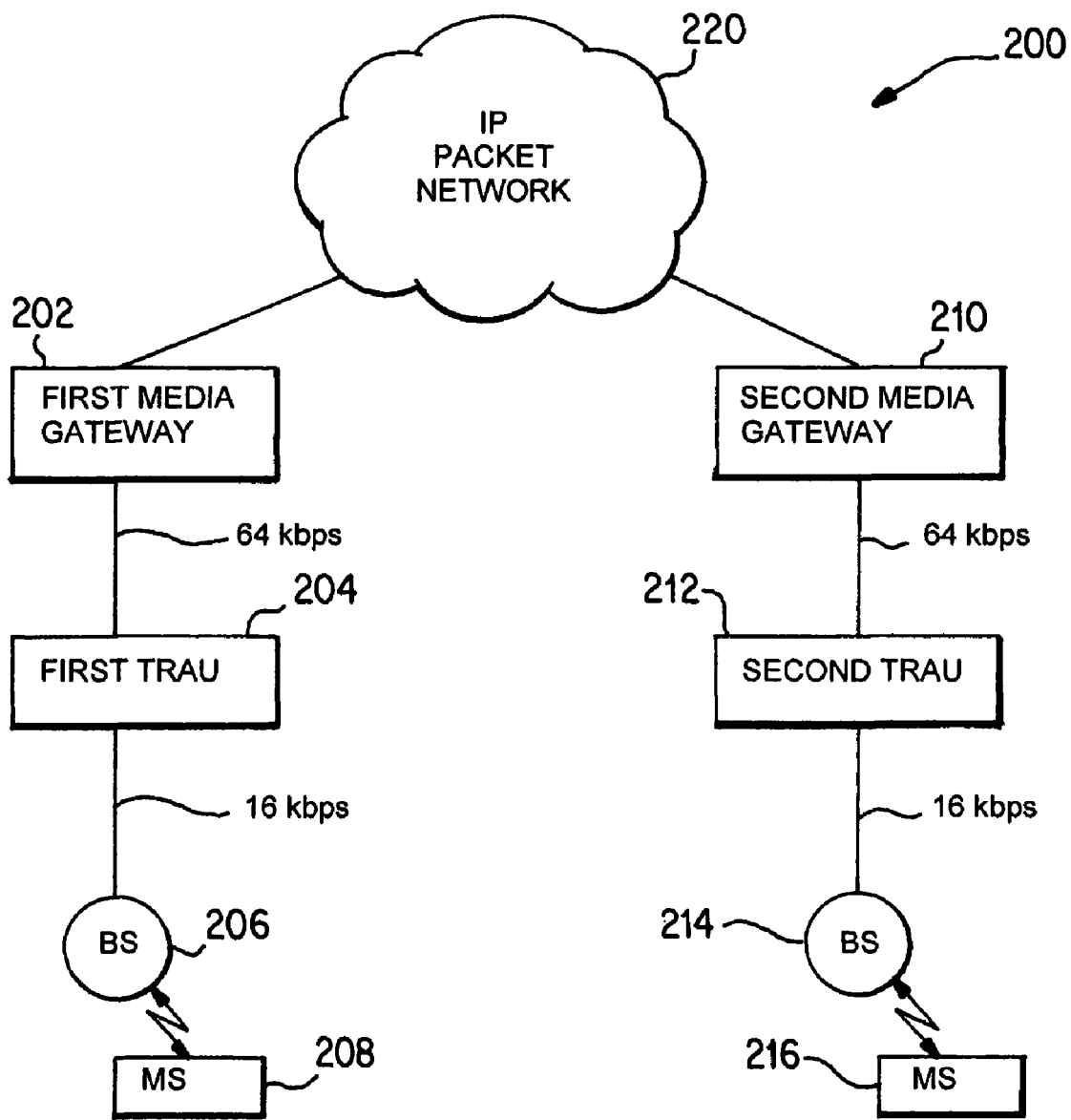
FIG. 2 illustrates a block diagram of an exemplary wireless communication system in accordance with an embodiment of the invention.

FIG. 2 illustrates a block diagram of an exemplary wireless communication system 200 in accordance with an embodiment of the invention. The system 200 comprises a first media gateway 202, a first transcoder and rate adapter unit (TRAU) 204, and a base station 206 all coupled together by a communications network. The system 200 further comprises a second media gateway 210, a second TRAU 212, and a second base station 214 all coupled together by another communications network. It shall be understood that the exemplary wireless communication system 200 may be more complicated, including more base stations, TRAUs and media gateways. In this example, the base station 206 is assigned to communicate with a mobile station (MS) 208 via a wireless medium, and the base station 214 is assigned to communicate with MS 216 via a wireless medium. The first and second media gateways 202 and 210 may be coupled to each other by way of an internet protocol (IP) packet network 220.

For illustrative purposes, the first media gateway 202 serves as the originator media gateway and the second media gateway 210 serves as the target media gateway because, in this example, a voice transmission is being sent from the originator MS 208 to the target MS 216. It shall be understood that the voice transmission may be sent from the MS 216 to the MS 208; in which case, the second media gateway 210 becomes the originator media gateway and the first media gateway 202 becomes the target media gateway. As discussed in more detail below, the operation performed by a media gateway depends on whether it is serving as the originator media gateway or the target media gateway.

In summary, the first (originator) media gateway 202 examines a predetermined number N of octets (bytes) of voice data it receives from the first TRAU 204 to determine whether the voice transmission should be sent in a tandem free operation (TFO) manner or in a normal manner (i.e., not in a TFO manner). More specifically, the first TRAU 204 receives the encoded voice data from the originator MS 208 by way of its assigned base station (BS) 206. The first TRAU 204 receives the encoded voice data at a rate lower than the standard full voice transmission rate (e.g., <64 kpbs).

Pursuant to TFO, the first TRAU 204 does not decode the encoded voice data it has received from the originator MS 208. The first TRAU 204 then sends the encoded voice data to the first (originator) media gateway 202 at the standard full voice transmission rate (e.g., 64 kpbs). Since the transmission rate from the first TRAU 204 to the first (originator) media gateway 202 is higher than the transmission rate from the MS 208 to the first TRAU 204, in order to maintain a substantially constant voice data transmission rate, the first TRAU 204 configures the voice data octets (bytes) it sends to the first (originator) media gateway 202 in a manner that each octet includes a first field (i.e., a first subset of bit(s)) containing voice data and a second field (i.e., a second subset of bit(s)) containing filler bits (e.g., a predetermined pattern, such as all ones or all zeros). As a specific example, the first TRAU 204 configures each voice data octet to include voice data in its two (2) least significant bits (LSB) and include the filler bits in its remaining six (6) most significant bits (MSB).

In the case of normal voice transmission operation (i.e., non-TFO operation), the first TRAU 204 decodes the encoded voice data it receives from the originator MS 208. The first TRAU 204 then sends the decoded voice data to the first (originator) media gateway 202 at the standard full voice transmission rate (e.g., 64 kpbs). Since the transmission rate from the first TRAU 204 to the first (originator) media gateway 202 is higher than the transmission rate from the MS 208 to the first TRAU 204, in order to maintain a substantially constant voice data rate, the first TRAU 204 configures the voice data octets (bytes) it sends to the first (originator) media gateway 202 in a manner that both the first and second fields include voice data. As a specific example, the first TRAU 204 configures each voice data octet to include voice data in all of its eight (8) bits.

By examining the voice data octets it receives from the first TRAU 204, the first (originator) media gateway 202 can determine whether the voice transmission is to be performed in a TFO manner or in a normal manner. More specifically, the first (originator) media gateway 202 examines the respective second fields of a predetermined number N of voice data octets it receives from the first TRAU 204. If the first (originator) media gateway 202 does not detect a change in the bits of the second fields of the N octets (meaning that the second fields contain filler bits), then the first (originator) media gateway 202 determines that the voice transmission should be sent in a TFO manner. On the other hand, if the first (originator) media gateway 202 does detect a change in the bits of the second fields of the received N octets (meaning that the second fields contain voice data), then the first (originator) media gateway 202 determines that the voice transmission should be sent in a normal manner.

In this manner, the first (originator) media gateway 202 can determine whether the voice transmission is to be sent across the IP network 220 in a TFO manner or in a normal manner independent of the protocol used by the first TRAU 204. Thus, the first TRAU 204 may use the GSM-TFO protocol or the CDMA-TFO protocol, and the first (originator) media gateway 202 can determine the manner of voice transmission without needing to recognized these specific protocols. This is a significant advantage because modification of existing wireless communication systems to IP network based communication systems with regard to TFO operation is substantially simplified.

If the first (originator) media gateway 202 determines that the voice transmission is in a TFO manner, the first media gateway 202 forms an IP packet containing data present only in the first fields of the N voice octets received from the first TRAU 204. If, on the other hand, the first (originator) media gateway 202 determines that the voice transmission is in a normal manner, the first (originator) media gateway 202 forms an IP packet containing data present in both the first and second fields of the N voice octets received from the first TRAU 204. The first (originator) media gateway 202 then sends the IP packet to the second (target) media gateway 210 by way of the IP packet network 220. In this manner, the voice transmission across the IP network 220 is very efficient.

After receiving the IP packet, the second (target) media gateway 210 examines the size of the packet. By examining the size of the IP packet, the second (target) media gateway 210 can determine whether the voice transmission is in a TFO manner or in a normal manner. More specifically, if the size of the received IP packet is smaller than a predetermined size, the second (target) media gateway 210 determines that the voice transmission is in a TFO manner. If, on the other hand, the size of the received IP packet network is substantially at the predetermined size, then the second (target) media gateway 210 determines that the voice transmission is in a normal manner. The reason why the IP packet size is deterministic of the voice transmission manner is that in a TFO manner, only data in the first field of the voice data octet is used to form the IP packet, whereas in a normal manner, data in both the first and second fields of the voice data octet is used to form the IP packet.

If the second (target) media gateway 210 determines that the voice transmission is in a TFO manner, the second (target) media gateway 210 forms N octets of voice data from the received IP packet, wherein each octet includes a first field containing the encoded voice data and a second field containing filler bits. As a specific example, the second (target) media gateway 210 configures each voice data octet to include voice data in the two (2) LSBs and include the filler bits in the remaining six (6) MSBs. If, on the other hand, the second (target) media gateway 210 determines that the voice transmission is in a normal manner, the second (target) media gateway 210 forms N octets of voice data from the received IP packet, wherein each octet includes first and second fields containing decoded voice data. As a specific example, the second (target) media gateway 210 configures each voice data octet to include voice data in all eight (8) bits. The second (target) media gateway 210 then sends the N octets to the second TRAU 212.

By examining the embedded information in the first field of the N octets received from the second (target) media gateway 210, the second TRAU 212 can determine, based on the TFO protocol used, whether the voice transmission is in a TFO manner or in a normal manner. If the second TRAU 212 determines that the voice transmission is in a TFO manner, the second TRAU 212 sends the encoded voice data to the target MS 216 by way of its assigned base station (BS) 214. If, on the other hand, the second TRAU 212 determines that the voice transmission is in a normal manner, the second TRAU 212 encodes the decoded voice data, and sends the encoded voice data to the target MS 216 by way of its assigned base station 214.

Figure 3A:
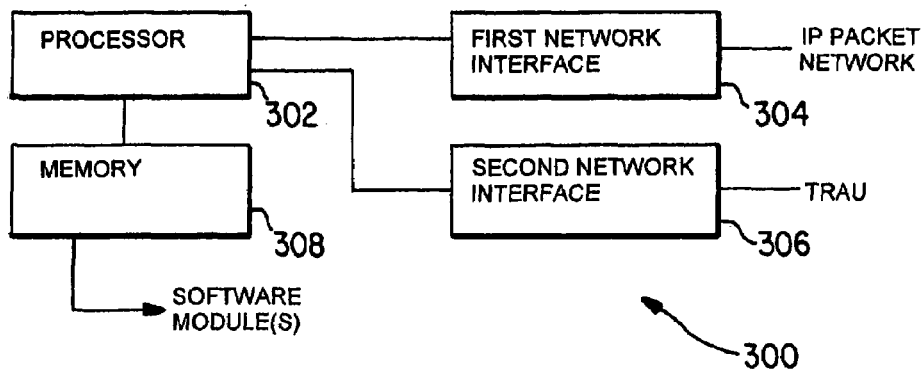
FIG. 3A illustrates a block diagram of an exemplary media gateway in accordance with another embodiment of the invention.

FIG. 3A illustrates a block diagram of an exemplary media gateway 300 in accordance with another embodiment of the invention. The media gateway 300 comprises a processor 302, a first network interface 304, a second network interface 306, and a memory 308. The processor 302 performs the various operations of the media gateway 300, including those described with reference to FIGS. 3B and 3C. The first network interface 304 provides an interface to an IP packet network used to communicate with another media gateway. The second network interface 306 provides an interface to a network used to communicate with a corresponding TRAU. And, the memory 308, serving generally as a computer readable medium, stores one or more software module(s) adapted to control the processor 302 in performing its various operations.

Figure 3B:
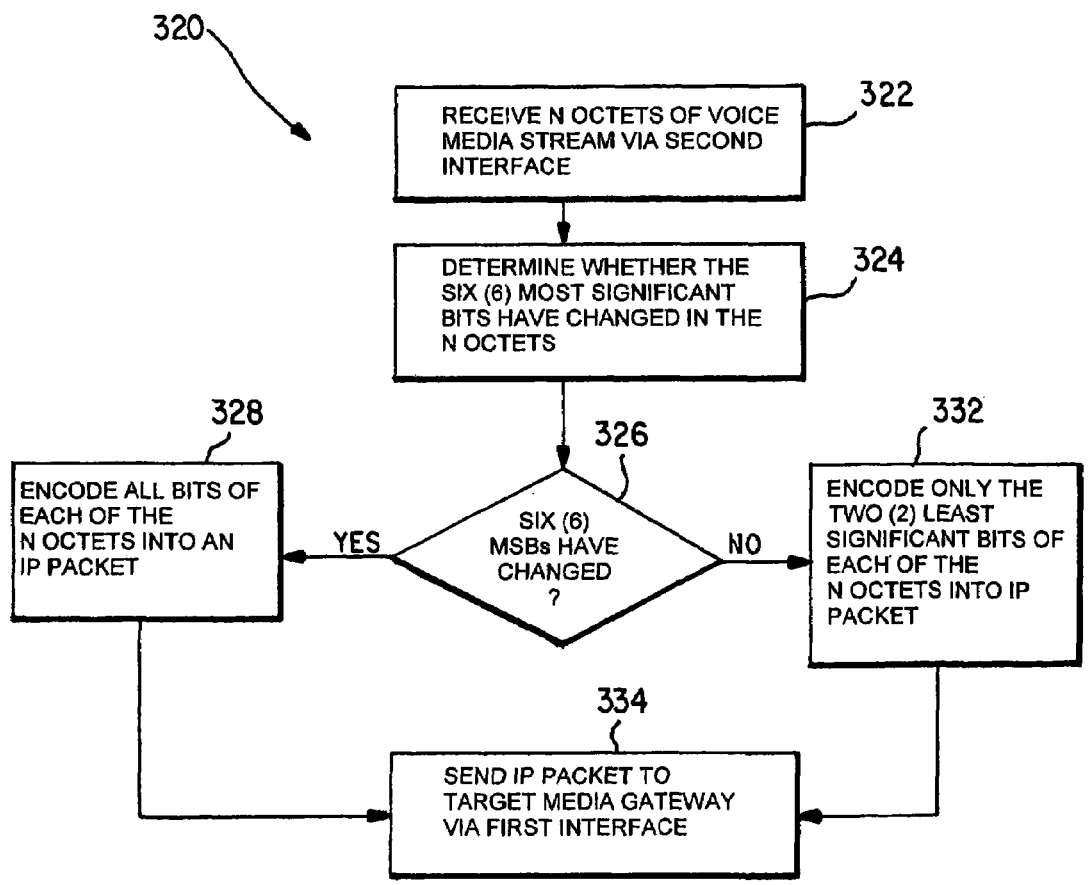
FIG. 3B illustrates a flow diagram of an exemplary method of processing voice data to be sent over an internet protocol (IP) network in accordance with another embodiment of the invention.

FIG. 3B illustrates a flow diagram of an exemplary method 320 of processing voice data to be sent over an internet protocol (IP) network in accordance with another embodiment of the invention. According to the method 320, the processor 302 receives a predetermined number N of octets of voice data from a corresponding TRAU by way of the second network interface 306 (block 322). The processor 302 then determines whether the second fields of the N octets (e.g., the six (6) MSBs of the octets) have changed (block 324). If the processor 302 determines that the second fields of the N octets have changed (block 326), the processor 302 forms an IP packet containing all bits of the N octets (block 328). If, on the other hand, the processor 302 determines that the second field of the N octets have not changed (block 326), the processor 302 forms an IP packet containing only the bits from the first fields of the N octets (block 332). Once the IP packet is formed, the processor 302 sends the IP packet to a target media gateway by way of the first network interface 304 (block 334).

Figure 3C:
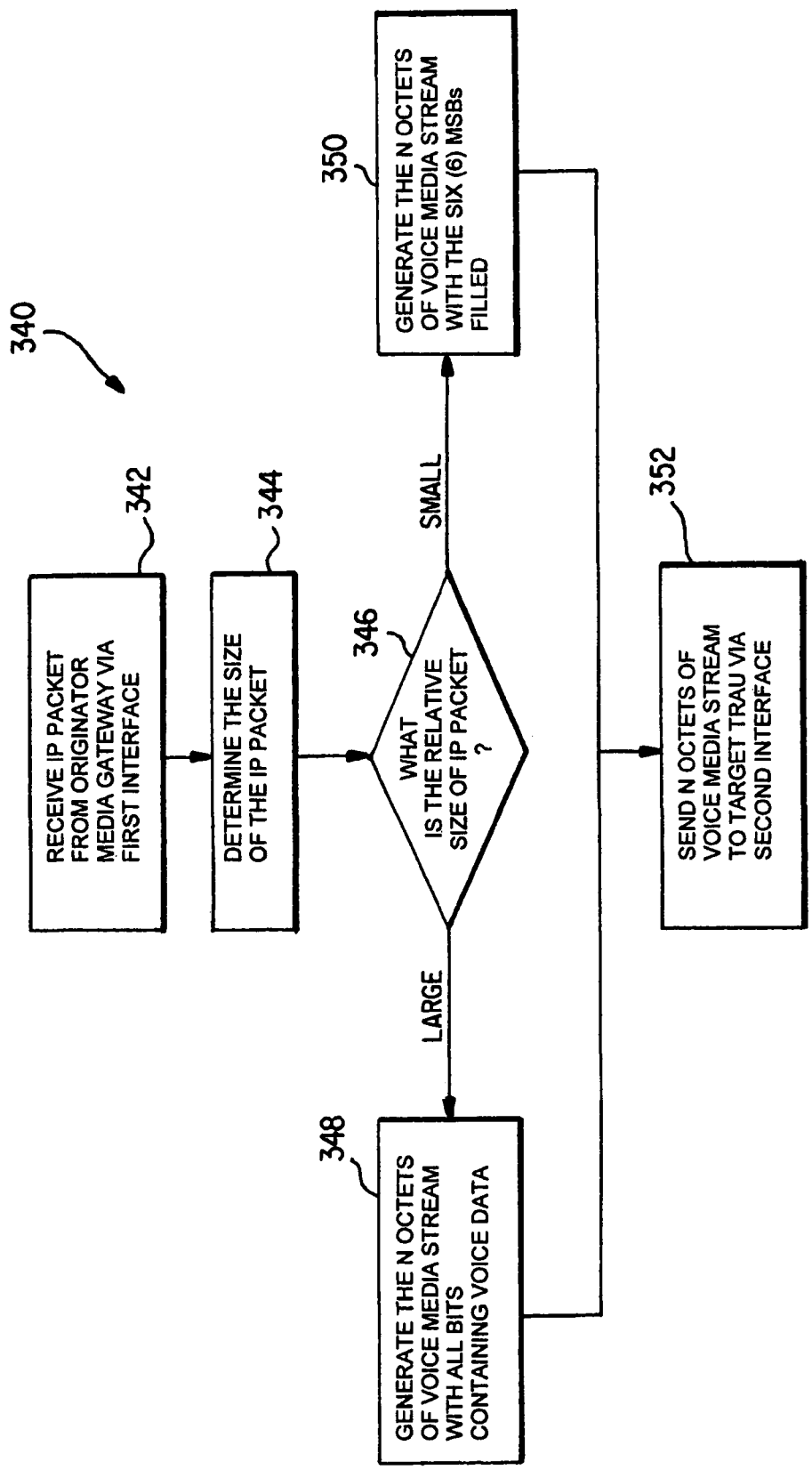
FIG. 3C illustrates a flow diagram of an exemplary method of processing voice data received from an internet protocol (IP) network in accordance with another embodiment of the invention.

FIG. 3C illustrates a flow diagram of an exemplary method 340 of processing voice data received from an internet protocol (IP) network in accordance with another embodiment of the invention. According to the method 340, the processor 302 receives an IP packet from an originator media gateway by way of the first network interface 304 (block 342). The processor 302 then determines the size of the IP packet (block 344). This may be performed in a number of ways, such as by counting the number of bits in the packet or its payload, by measuring the time length of the packet, or by other techniques. If the processor 302 determines that the size of the IP packet is relatively large (e.g., above a threshold or of a particular size) (block 346), the processor 302 generates N octets of voice data each having two fields containing voice data (block 348). If, on the other hand, the processor 302 determines that the size of the IP packet is relatively small (block 346), the processor generates N octets each having a first field containing voice data and a second field containing filler bits (block 350). The processor 302 then sends the N octets to a corresponding TRAU by way of the second network interface 306 (block 352).

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A wireless communication system, comprising:
a base station;
a transcoder and rate adapter unit (TRAU); and
a media gateway adapted to:
examine a predetermined number N of voice data groups received from said TRAU, wherein each of said voice data groups comprises first and second fields;
determine whether said first fields comprises compressed voice data or uncompressed voice data by determining whether bits in respective second fields of said N groups are filler bits; and
form a data packet including data in said first fields but not in said second fields of said N groups if the bits in said second fields of said N groups are said filler bits, or including data in said first and second fields of said N groups if the bits in said second fields of said N groups are not said filler bits.

2. The wireless communication system of claim 1, wherein said group comprises an octet.

3. The wireless communication system of claim 2, wherein said first field comprises one or more lesser significant bits of said octet, and said second field comprises one or more greater significant bits of said octet.

4. The wireless communication system of claim 1, wherein said filler bits comprise a predetermined pattern.

5. The wireless communication system of claim 4, wherein said predetermined pattern consists of all ones.

6. The wireless communication system of claim 4, wherein said predetermined pattern consists of all zeros.

7. The wireless communication system of claim 1, wherein said media gateway is adapted to receive said predetermined number N of voice data groups from said TRAU by way of a network.

8. The wireless communication system of claim 1, wherein said media gateway is adapted to send said data packet to another media gateway by way of a network.

9. The wireless communication system of claim 8, wherein said network comprises an internet protocol (IP) packet network.

10. The wireless communication system of claim 1, wherein said data packet comprises an internet protocol (IP) data packet.

11. A wireless communication system, comprising:
a base station;
a transcoder and rate adapter unit (TRAU); and
a media gateway adapted to:
receive a data packet;
determine a size of said data packet; and
form a predetermined number N of voice data groups, wherein each of said voice data groups comprises a first field and a second field, wherein said first field includes data from said data packet and said second field includes filler bits if the size of said data packet is relatively small, or said first and second fields include data from said data packet if the size of said data packet is relatively large.

12. The wireless communication system of claim 11, wherein said group comprises an octet.

13. The wireless communication system of claim 12, wherein said first field comprises one or more lesser significant bits of said octet, and said second field comprises one or more greater significant bits of said octet.

14. The wireless communication system of claim 11, wherein said filler bits comprise a predetermined pattern.

15. The wireless communication system of claim 14, wherein said predetermined pattern consists of all ones.

16. The wireless communication system of claim 14, wherein said predetermined pattern consists of all zeros.

17. The wireless communication system of claim 11, wherein said media gateway is adapted to send said predetermined number N of voice data groups to said TRAU by way of a network.

18. The wireless communication system of claim 11, wherein said media gateway is adapted to receive said data packet from another media gateway by way of a network.

19. The wireless communication system of claim 18, wherein said network comprises an internet protocol (IP) packet network.

20. The wireless communication system of claim 11, wherein said data packet comprises an internet protocol (IP) data packet.

21. A network device, comprising:
a first network interface;
a second network interface; and
a processor adapted to:
examine a predetermined number N of voice data groups received from a transcoder and rate adapter unit (TRAU) by way of said first network interface, wherein each of said voice data groups comprises first and second fields;
determine whether said first fields comprises compressed voice data or uncompressed voice data by determining whether bits in respective second fields of said N groups are filler bits;
form a data packet including data in said first fields and but not in said second fields of said N groups if the bits in respective second fields of said N groups are filler bits, or including data in said first and second fields of said N groups if the bits in respective second fields of said N groups are not filler bits;
send said data packet to another network device by way of said second network interface.

22. A method, comprising:
examining a predetermined number N of voice data groups, wherein each of said voice data groups comprises first and second fields;
determining whether said first fields comprises compressed voice data or uncompressed voice data by determining whether bits in said second fields of said N groups are filler bits;
forming a data packet including data in said first fields but not in said second fields of said N groups if the bits in said second fields of said N groups are filler bits, or including data in said first and second fields of said N groups if the bits in said second fields of said N groups are not filler bits;
sending said data packet to a target device.

23. A computer readable medium including one or more software modules adapted to control a processor to:
examine a predetermined number N of voice data groups received from a transcoder and rate adapter unit (TRAU), wherein each of said voice data groups comprises first and second fields;
determine whether said first fields comprises compressed voice data or uncompressed voice data by determining whether bits in respective second fields of said N groups are filler bits;
form a data packet including data in said first fields but not in said second fields of said N groups if the bits in respective second fields of said N groups are filler bits, or including data in said first and second fields of said N groups if the bits in respective second fields of said N groups are not filler bits;
send said data packet to another network device.

24. A network device, comprising:
a first network interface;
a second network interface; and
a processor adapted to:
receive a data packet by way of said first network interface;
determine a size of said data packet;
form a predetermined number N of voice data groups, wherein each of said voice data groups comprises a first field and a second field, wherein said first field includes data from said data packet and said second field includes filler bits if the size of said data packet is relatively small, or said first and second fields includes data from said data packet if the size of said data packet is relatively large; and
send said predetermined number N of voice data groups to a transcoder and rate adapter unit (TRAU) by way of said second network interface.

25. A method, comprising:
receiving a data packet;
determining a size of said data packet;
forming a predetermined number N of voice data groups, wherein each of said voice data groups comprises a first field and a second field, wherein said first field includes data from said data packet and said second field includes filler bits if the size of said data packet is relatively small, or wherein said first and second fields includes data from said data packet if the size of said data packet is relatively large; and
sending said predetermined number N of voice data groups to a transcoder and rate adapter unit (TRAU).

26. A computer readable medium including one or more software modules adapted to control a processor to:
receive a data packet;
determine a size of said data packet;
form a predetermined number N of voice data groups, wherein each of said voice data groups comprises a first field and a second field, wherein said first field includes data from said data packet and said second field includes filler bits if the size of said data packet is relatively small, or said first and second fields includes data from said data packet if the size of said data packet is relatively large; and
send said predetermined number N of voice data groups to a transcoder and rate adapter unit (TRAU).

27. A wireless communication system, comprising:
a base station;
a transcoder and rate adapter unit (TRAU); and
a media gateway adapted to determine whether a predetermined number N of voice data groups contain compressed voice data or uncompressed voice data by:
examining said predetermined number N of voice data groups, wherein each of said voice data groups comprises first and second fields;
determine whether bits in respective second fields of said N groups are filler bits; and
determine that said predetermined number N of voice data groups contain compressed voice data if it determines that said respective second fields of said N groups contain filler bits; or
determine that said predetermined N number of voice data groups contain uncompressed voice data if it determines that said respective second fields of said N groups does not contain filler bits.

* * * * *